United States Patent
Jousse et al.

(10) Patent No.: US 6,677,024 B2
(45) Date of Patent: *Jan. 13, 2004

(54) GLASS SPACER

(75) Inventors: Didier Jousse, Taverny (FR); Rene Gy, Bondy (FR)

(73) Assignee: Saint-Gobain Glass France, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,133

(22) PCT Filed: Apr. 28, 1999

(86) PCT No.: PCT/FR99/01004
§ 371 (c)(1),
(2), (4) Date: Apr. 27, 2000

(87) PCT Pub. No.: WO99/56302
PCT Pub. Date: Nov. 4, 1999

(65) Prior Publication Data
US 2002/0187299 A1 Dec. 12, 2002

(30) Foreign Application Priority Data
Apr. 29, 1998 (FR) .............................. 98 05371

(51) Int. Cl.$^7$ ................................................ B32B 3/02
(52) U.S. Cl. ................. 428/80; 52/172; 52/786.13; 428/66.4; 428/66.7; 428/409; 428/410; 428/432
(58) Field of Search ....................... 428/80, 34, 66.4, 428/66.7, 409, 410, 432; 52/786.13, 172

(56) References Cited

U.S. PATENT DOCUMENTS 5,561,343 A * 10/1996 Lowe ........................ 313/482
5,721,050 A * 2/1998 Roman ...................... 428/397

\* cited by examiner

*Primary Examiner*—Nasser Ahmad
(74) *Attorney, Agent, or Firm*—Oblon, Spivak, McClelland, Maier & Neustadt, P.C.

(57) ABSTRACT

A glass spacer, obtained by a drawing process, having an approximately polygonal bearing cross-section with at least one rectangle having the dimensions a, b, and the spacer having a height 1, the dimensions of the glass spacer satisfying the relationship of $a<300\,\mu m$, $0.2\,mm<l<20\,mm$, and $b/a<1000$, and preferably $b/a<200$.

26 Claims, 5 Drawing Sheets

GLASS SPACER

BACKGROUND OF THE INVENTION

1. Field of the Invention

The invention relates to a glass spacer having an approximately polygonal bearing cross section, intended to keep two flat substrates spaced apart.

Although the invention is not limited to such applications, it will more particularly be described with reference to spacers used for maintaining a space between two glass sheets, more particularly a space of small thickness, generally of less than a few millimetres, over the entire surface of the glass sheets.

2. Discussion of the Background

Such a configuration is widely sought in the production of display screens, whatever the technology involved. They may be plasma screens or field-emission (FED) screens, such as microdot screens. Such a configuration may also be sought for the production of vacuum glazing or for flat lamps. The expression "flat lamps" should be understood as encompassing lamps that may have a curvature over at least part of their surface, whatever, moreover, the technology of these lamps.

This is because, in this type of screen, a small space must be maintained, especially in order to create a vacuum between the two glass sheets.

It is known, as described in document WO-81/01910, that this type of screen, more particularly the outer glass sheet, i.e. the glass sheet seen by an observer, must have a high optical transparency.

The spacers making it possible to maintain a space between the two glass sheets must consequently be the least visible possible.

It has been proposed to produce glass spacers in the form of polished cylinders or balls so as to be the least visible possible.

Although these spacers seem to be readily producible on an industrial scale, there are stability problems in their use. This is because the rounded shapes cause rolling movements during installation or possibly after fitting.

To remedy this problem, it has therefore been envisaged to produce glass spacers having a rectangular cross section. Because of their flat surfaces in contact with the glass sheets, these spacers provide better stability.

Another drawback resides in the preparation of these spacers. They are generally produced by machine, which does not allow polished surfaces to be obtained in a simple manner.

To alleviate these drawbacks, document EP-0,627,389 A has therefore proposed a process for manufacturing a glass polyhedron in which a preform of polygonal cross section, advantageously polished on all its lateral faces, is firstly drawn and then cut into several rods, which rods, after they have been collected together, are in turn cut to the desired length and then polished at their ends.

This technique is advantageous in so far as it allows glass spacers to be produced, at lower cost, with dimensions that are nevertheless quite difficult, each of these glass polyhedra having very small dimensions, directly equal to those required by the intended application.

This is because, in the case of display screens, such as microdot screens, the spacers have to be installed very precisely on separating strips. These separating strips are provided either in one direction, or in two perpendicular directions, in order to delimit the colour pixels. Installing the spacers has to be carried out so that they do not encroach on the pixel areas.

SUMMARY OF THE INVENTION

The inventors were thus tasked with the mission of defining glass spacers which fulfil their space-maintaining function between, for example, two flat substrates and which may be installed precisely, for example without any risk of disturbing the pixels, and the installation of which may be carried out in an industrializable manner.

The word "industrializable" should be understood to mean that the spacers must be able to be installed precisely and reproducibly, for example with the aid of an industrial robot, bearing in mind the precision of the latter.

This objective is achieved according to the invention by a glass spacer, obtained by a drawing process, having an approximately polygonal bearing cross section with at least one rectilinear surface which falls within a rectangle of dimensions a, b, the said spacer having a height 1, and the dimensions of the spacer satisfying the following relationships:

$a < 300 \mu m$ $0.2 \text{ mm} < 1 < 20 \text{ mm}$ $b/a < 1000$ and preferably $b/a < 200$.

A spacer thus defined according to the invention may fulfil its function, for example between two glass sheets in the case of a display screen. Moreover, it is possible to install such spacers with the aid of an industrial robot; it is especially possible to position such spacers on the separating strips without any risk of obstructing the pixels, bearing in mind the uncertainty in the precision of the robots and the minimal dimensions required in order to fulfil the function. For applications relating to screens of the medium-voltage and high-voltage FED type, the dimensions of the spacer advantageously satisfy the relationship: $0.5 < 1 < 5$ mm and preferably $1 < 1 < 3$.

According to a preferred embodiment, the dimensions of the spacer satisfy the relationship:

$0.1 < b/1$, and preferably $1 < b/1$.

Such a condition allows the stability of the spacer to be improved, this improvement being useful particularly when the robot grips the spacer, in order to be certain of the automatic orientation of the said spacer, and when the latter is deposited on a substrate so that it does not fall over.

Also to improve the gripping of the spacer by a robot, since its orientation is fixed, the dimensions of the spacer advantageously satisfy the relationship:

$b/1 \leq 50$.

Such spacers may be produced using a technique such as that proposed in document EP-0,627,389 A. This document describes a process which consists in drawing a glass preform or rod having a cross section with a shape approximately identical to that which it is desired to obtain to within a homothetic ratio. This preform has a large enough size to be able to be accurately machined to the desired cross section. In addition, this preform is initially polished on its lateral faces.

This drawing step takes place with the temperature of the preform raised to a temperature close to its softening temperature and the actual drawing then takes place in one or more steps.

The drawn rod obtained after drawing the preform has a cross section with a shape similar to that of the preform to within a homothetic ratio, which corresponds to the cross section of the desired spacers. Moreover, the rod has a polished appearance on its side faces because it passes through a high temperature which creates a "fire polish." This phenomenon may make it possible to use a preform not polished on its lateral faces but having another appearance, such as a "finely ground" appearance. The invention refers, through the term "fire polish," to a surface roughness (rms value) of less than 5 Å measured by AFM (atomic force microscopy) on a scanned area of approximately 6 $\mu m^2$. Preferably, this roughness is of the order of 2Å.

These rods are collected together so as to be mutually parallel. Preferably, these rods are collected together in a cylinder, especially a glass cylinder, and are joined together using a binder such as a wax or adhesive.

Next, the bundle of rods is cut to the desired length so that they form the desired spacers.

Having obtained the length, the bundle of spacers is ground then polished at the two ends. It is thus possible to obtain spacers polished over all their faces. In addition, if the cutting operation is not very precise, it is thus possible to rectify the length of the spacers during the polishing operation.

Next, the spacers are separated from one another, especially by melting the binder, or by chemical dissolution.

The process thus described makes it possible to obtain spacers with precise dimensions and at a lower cost. This is because the manual operations carried out by an operator are very limited. On the one hand, this reduces the production costs and, on the other hand, the operations leading to the dimensions, by not being manual, are both precise and regular.

According to one embodiment variant of these spacers, the rods are not cut to the desired length and they constitute, as it were, a "stock" of spacers bound together. According to a first embodiment of this variant, the spacers may be sold or delivered in the form of reels or rolls formed of the uncut rod.

According to a second embodiment of this variant, the rod has transverse notches which define the spacers. Such notches are obtained, for example, by a rotating mechanical tool, preferably of the diamond type, placed beneath the drawing mechanism.

These notches advantageously have an indentation shape. They may have a depth of at most 30% of the minimum width of the polygonal cross section. This depth may be at most equal to 20 $\mu$m and preferably at most 10 $\mu$m. The width of a notch is advantageously less than 20 $\mu$m.

This second embodiment variant is useful for applications in which the spacers do not need to be polished on all their faces.

According to either of the variants, the cross section of the spacer, in a plane orthogonal to the drawing direction, has a square, triangular, rectangular or trapezoidal shape.

According to other embodiments, the cross section in a plane orthogonal to the drawing direction, has a "U" shape, an "H" shape, a cross shape or a shape which includes at least one crenellated part. Moreover, the spacers obtained according to either of these variants are such that the vertices of the approximately polygonal cross section are, because of the drawing process, rounded with a radius of curvature of between 2 and 10 microns and preferably of between 5 and 10 microns. These rounded vertices make it possible, especially for certain applications, to reduce the risks of damage to the glass sheets and possibly to the layers deposited on their surfaces in the event of slippage, for example when installing the said spacers.

According to a first variant, the spacers satisfy the relationship:

b<5 mm, and preferably b<3 mm.

These are therefore spacers which may be termed "pillars"; they are frequently used in display screens, vacuum glazing and flat lamps. For this type of spacer, the abovementioned rounded part, obtained because of the drawing process, and thus the absence of sharp edges, prevents the appearance of a point effect on the spacer.

According to a second variant, the spacers satisfy the relationship:

5 mm<b.

These are therefore spacers which may be termed "ribs" because they are more elongate; they are frequently used for display screens. For such applications, the dimension b may be equal to the dimension of one of the sides of the object into which the spacer has to be incorporated, for example a screen. For this type of spacer, the abovementioned rounded part, obtained because of the drawing process, makes it possible to conceal the sharp edge forming the triple point (vacuum, metal, spacer) facing the opposite anode, a point known to promote the initiation of breakdown.

In this second variant, the approximately polygonal bearing cross section of the spacer does not correspond to the cross section of the rod obtained after drawing, this bearing cross section of the spacer in this variant being a lateral face of the said rod, one of the dimensions of which corresponds to the length to which the spacer is cut (or notched) after drawing.

It is clearly apparent that whatever the type of spacer desired, the precision of the dimensions of the spacers according to the invention is high.

It follows that the stability over time of the dimensions obtained by the process for manufacturing the spacers is paramount. Now, the drawing process, such as that described in document EP-0,627,389 A, although satisfactory, has to be continuously monitored so that there is no drift in the dimensions. Moreover, in order to limit the loss of material, this monitoring is advantageously carried out optically during the drawing operation, for example with the aid of a laser beam which is used to monitor the centring of the preform with respect to the heating system and to monitor the dimensions of the rod so as to correct the drawing parameters directly.

Such optical monitoring, which has the advantage of being contact-free, is based on contrast analysis of an image in transmission. However, it appears that most of the desired shapes do not provide a sufficient contrast to allow satisfactory analysis.

Thus, the inventors have therefore wished to define spacers whose shapes are compatible with this type of monitoring.

In order to meet this objective, they propose a spacer which has the shape of a right prism whose cross section is an orthogonal polygon deformed on at least one of its sides. The term orthogonal polygon denotes polygons two adjacent sides of which are orthogonal.

This characteristic of the spacers, which allows in-line monitoring of the quality of the drawing and of the dimensions, is shown above more particularly as being advantageous in the case of spacers according to the invention whose main characteristics ensure easy handling. However, this characteristic of the spacers, which is connected with dimensional monitoring, must be understood as being applicable to any type of spacer and especially also to spacers not having the abovementioned characteristics.

According to one embodiment, the shape of the spacer is such that its cross section has at least one curved side.

According to another embodiment, the polygonal cross section of the spacer has at least two consecutive sides forming a non-right angle and preferably an obtuse angle.

According to either of these embodiments, the shape of the spacer allows the dimensions of the rod during drawing to be optically monitored. This is because such shapes, which may include a "deformation" of an orthogonal polyhedron, make it possible to obtain, during the optical monitoring, an image in transmission having sufficient contrast. Such a contrast has various peaks which make it possible, on the one hand, to control the centring of the rod with respect to the drawing device and, on the other hand, to measure the dimensional characteristics a, b. The rate of drawing may be automatically modulated in order to guarantee the required dimensions of the spacer.

According to other advantageous embodiments, the spacer may have the various characteristics or properties which will now be explained. These are electrical, optical and mechanical properties. These various characteristics may or may not be present simultaneously. Moreover, if they are present, as is particularly advantageous in the case of the spacers having the abovementioned characteristics, these new characteristics may be applied to any type of spacer and may be regarded as novel characteristics as such.

Thus, according to the invention, the spacer advantageously has, at least partly, a surface exhibiting electronic conduction.

What is extremely advantageous with such a surface is that, when the glass spacer is used to separate two glass sheets belonging to a field-emission (FED) screen, any risk of the so-called "breakdown" effect is avoided. This is because the breakdown effect results from an accumulation of charges and occurs between the grid and the anode of a field-emission screen, and, in many situations, through the spacer(s) in question. However, the abovementioned surface, whose resistivity will be suitably selected by one skilled in the art depending on the geometrical dimensions of the spacer and of the type of screen used, helps considerably to dissipate the charges. This charge dissipation consequently establishes a leakage current and therefore prevents any risk of breakdown. Such a conducting layer, which prevents the accumulation of charges, is advantageously chosen to have a secondary-electron emission coefficient of less than or equal to 1.

Preferably, the spacer has a resistance to the passage of current, for example between two glass sheets, of between 0.1 GΩ and 200 GΩ, preferably between 0.5 GΩ and 200 GΩ, more preferably between 1 GΩ and 100 GΩ and advantageously equal to 10 GΩ.

Several embodiments may be envisaged for giving the lateral surface a suitable resistivity.

According to a first variant, the lateral surface of the fibre is covered at least partly with a conductive coating. This may be obtained, for example, using a gas-phase pyrolysis technique, called CVD, a liquid-phase pyrolysis technique, a powder-form solid-phase pyrolysis technique or a vacuum deposition technique. This deposition may be carried out during the manufacture of the glass fibre according to the invention or subsequently.

The coating is, for example, made of amorphous silicon having a low hydrogen content, i.e. a hydrogen content of less than 5%. It may also be doubly doped amorphous silicon, for example doped with elements such as boron, phosphorus, arsenic or antimony.

According to a second variant, the glass fibre contains, on its periphery, conducting elements of the Ag, Au or Cu type.

It is, for example, possible to introduce into the composition of the preform conducting elements of the Ag, Au or Cu type, these being intended to give the lateral surface of the spacer a conductive coating, as mentioned above.

In order to make these elements migrate to the lateral surface of the spacer, those skilled in the art may, for example, once the rod has been drawn and shaped into the glass fibre according to the invention, subject the latter to a suitable heat treatment. This heat treatment may, for example, be a prolonged treatment in a furnace in a reducing atmosphere so as to make the metal atoms migrate to the surface in order to form aggregates. In any case, the temperature and the duration of the heat treatment will be controlled in order to obtain the resistivity value of the spacer in question.

According to another embodiment, it is possible to carry out an ion-exchange treatment, for example in a mixed bath combining silver and potassium in the form of nitrates. This treatment may be carried out after drawing, before or after the drawn rods have been cut to form the spacers. The moment of the treatment defines whether only the side walls will be conducting or if also the cross sections corresponding to the cutting and/or polishing area will be conducting.

Another characteristic of the spacer according to the invention is that it is advantageously at least partially delustred.

Such a property makes it possible to obtain scattering spacers which are advantageous, for example, for use in flat lamps or insulating vacuum glazing.

The delustred appearance may, for example, be obtained by acid etching in a bath containing ammonium fluoride and hydrochloric acid. The treatment may be carried out at various stages in the manufacturing process depending on the regions which it is desired to delustre. It may be carried out on the rod after drawing so that polished sections are retained; it may be carried out after obtaining the spacers so as to delustre all of their surfaces; it may also be carried out at an intermediate stage i.e. after cutting the spacers to length but while the latter are still embedded in a binder so as to delustre only the sections of the said spacers. The surfaces thus delustred have a fine relief consisting of a juxtaposition of, as it were, small pyramids which create a light-trapping effect.

Measurements of the scattered light intensity in transmission by a spacer of the "rib" type, having a dimension equal to 70 μm and a height 1 of between 3 and 4 mm, were carried out before and after the treatment conferring a delustred appearance. After treatment, the amount of scattering in transmission is of the order of 4%; it is close to 95% after treatment.

According to another embodiment, the spacers are covered over at least part of their surface with an optical coating, for example an antireflection stack consisting of one or more thin layers, especially interference layers, which may also result in a light-trapping effect.

One final characteristic of the spacer according to the invention is that it is advantageously mechanically toughened by an ion-exchange treatment. The toughening is defined, for example, so as to provide resistance to crushing by a 5 kg load for a dimension such that a=50 microns.

Advantageously, such a treatment is combined with the ion-exchange treatment, described above for forming conducting regions, in a bath containing, for example, both silver and potassium.

The spacers thus described according to the invention are particularly suitable for use in the production of display screens, such as plasma or microdot screens, or else for producing insulating vacuum glazing or flat lamps.

BRIEF DESCRIPTION OF THE DRAWINGS

Further advantageous details and characteristics of the invention will emerge below from the description of illustrative, but non-limiting, examples of the invention, with reference to FIGS. 1 to 14 which show, respectively.

Figure 1:
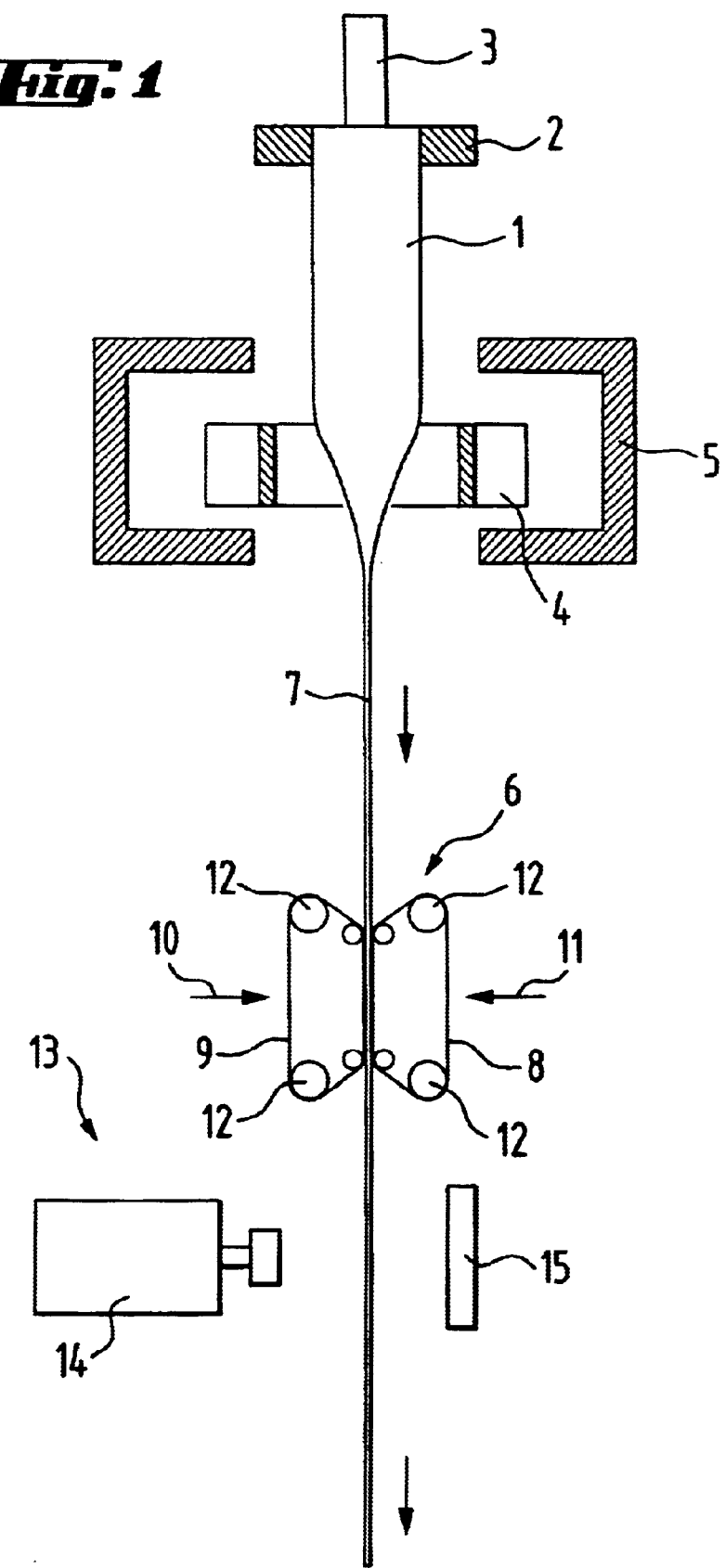
FIG. 1: a diagram of an apparatus for producing spacers according to the invention.

The figures have not been produced to scale in order to improve the understanding of the invention and, moreover, the rounded parts which appear because of the drawing process have not been shown.

DESCRIPTION OF THE PREFERRED EMBODIMENTS

FIG. 1 shows the diagram of a plant for producing spacers according to the invention, the dimensions of which are given in the table below.

A preform 1, in the present case of rectangular cross section, the dimensions of which are also given in the table below, is fixed to a support 2.

The support 2 is itself fixed to a mechanical system. This mechanical system 2, which may for example be an endless screw, allows the preform 1 to be given a vertical downward movement along the shaft 3, which preform may thus pass through a heating ring 4 approximately 70 millimetres in height.

Figure 2:
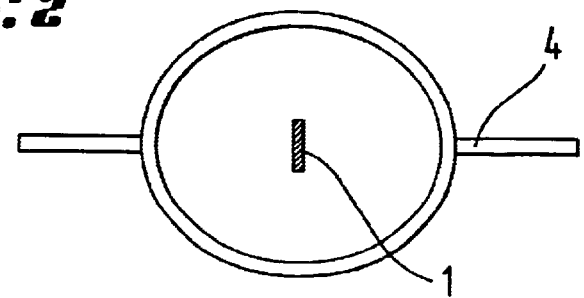
FIG. 2: an enlarged diagrammatic view of part of the apparatus shown in FIG. 1.

This heating ring 4, shown in FIG. 2, is heated by low-voltage resistance heating and has a slightly oval shape. This allows better distribution of the heat around the preform such that the temperature is regulated to within ±0.1 degrees at 800° C.

The heating ring 4 is surrounded by an insulating refractory 5. A drawing device 6, placed at a distance of approximately 500 millimetres below the heating ring, allows the preform 1 to be drawn so as to obtain a glass rod or fibre 7.

The device 6 is composed of two driving belts 8, 9 on which lateral compressive forces 10, 11 are exerted. These compressive forces 10, 11 favour the drawing operation and are exerted via means (not shown) which are, for example, small pressure-adjustable hydraulic cylinders.

The draw rate is directly related to the speed of rotation of the rollers 12 which each drive the two driving belts 8, 9.

The driving belts 8, 9 are made of a material, for example silicone, preventing them from slippage on the glass and therefore making it possible to obtain uniform drawing.

Depending on the drawing process, it is possible to maintain virtually the same profile, i.e. the same rectangular shape, between the preform 1 and the glass rod 7, with a homothetic ratio between the two.

Tests carried out with a draw rate of about 200 mm of fibres/minute corroborate this statement.

The results of three of these tests, 1, 2 and 3, are given in the table below.

|  |  | Preform 1 | Glass fibre 7 | Homothetic ratio |
|---|---|---|---|---|
| Width | 1 | 17.2 | 0.972 | 17.69 |
|  | 2 | 17.2 | .0980 | 17.55 |
|  | 3 | 17.2 | 0.990 | 17.37 |
| Thickness | 1 | 1.3 | 0.080 | 18.25 |
|  | 2 | 1.3 | 0.081 | 16.05 |
|  | 3 | 1.3 | 0.082 | 15.85 |

Furthermore, for each of the three glass fibres relating to Tests 1, 2 and 3, the rms roughness of the lateral faces of the fibre was determined. In all cases, the roughness is less than 5 Å for a scanned area of 6.25 $\mu m^2$.

Finally, the radius of curvature of the four vertices of each rectangular cross section of the fibres, which cross section was polished beforehand, was determined.

In all cases, the radius of curvature is between 5 and 10 $\mu$m.

Let us now return to FIG. 1. Downstream of the driving belts 8, 9 is an optical monitoring device 13 consisting, on the one hand, of an emitter 14, for example of the laser type, and of a receiver 15 coupled to a system (not shown in the figures) allowing the image of the rod 7 in transmission to be analysed. The contrasts in this image will allow the dimensions of the rod 7 to be monitored. This monitoring is thus carried out rapidly in line so as to be able to correct the various drawing parameters should the desired shapes and dimensions not comply with the specifications. Moreover, should an incorrect rod be manufactured, the latter, or at least part of it, is immediately scrapped.

The rods 7 at least are optionally cut to an approximate length and are collected together so as to be mutually parallel in a cylinder and joined together using a low-melting-point wax. The bundle of rods 7 is then cut and polished in order to form the spacers. Next, the latter are recovered by melting the wax or by chemical dissolution.

The spacers may then, or during the drawing process, undergo various types of treatment, such as those mentioned above, giving them mechanical properties, for example by chemical toughening, optical properties, for example by making them at least partially scattering, or even electrical properties, for example by making the surfaces at least partially conducting.

Figure 3:
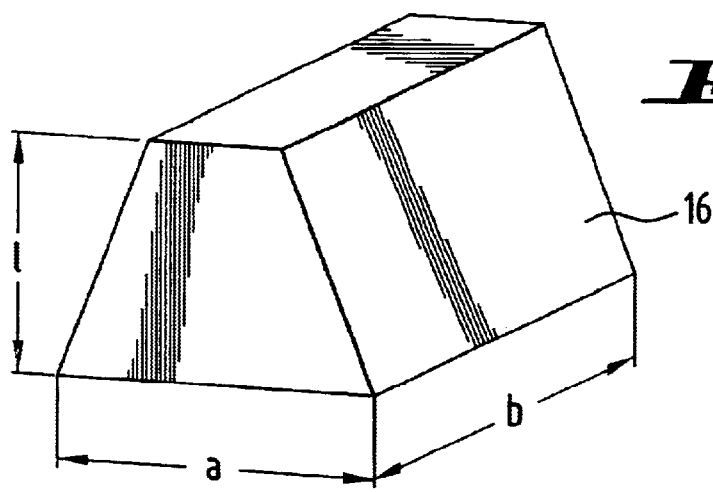
FIG. 3: a diagrammatic perspective view of a first spacer according to the invention.
Figure 4:
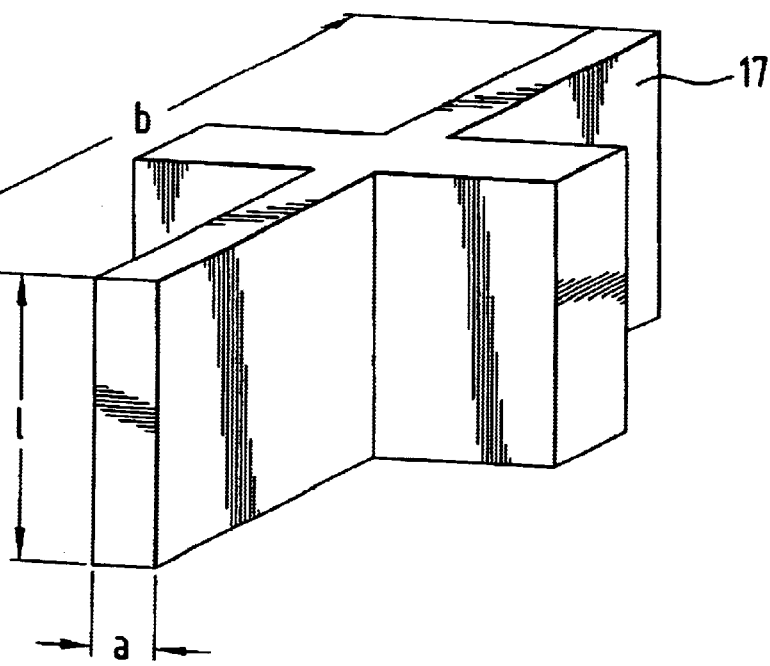
FIG. 4: a diagrammatic perspective view of a second spacer according to the invention.
Figure 5:
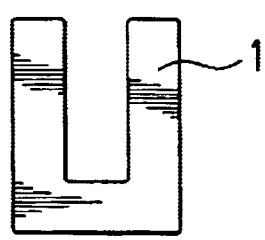
FIGS. 5 to 7: various possible shapes of the cross section of a spacer according to the invention.
Figure 6:
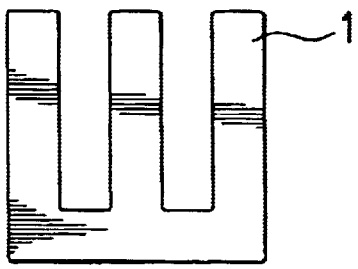

Such spacers according to the invention are shown in perspective in FIGS. 3 and 4.

FIG. 3 shows a spacer 16 of the "rib" type, the drawing cross section of which is trapezoidal. The bearing surface, i.e. the surface in contact for example with a glass sheet, is rectangular and has the dimensions a, b. The height 1 of the spacer makes it possible to maintain an identical space 1 between two glass sheets. Such a spacer 16 was produced with the following dimensions:

a=150 $\mu$m
b=40
1=2 mm.

It was demonstrated, during tests, that the handling, by a robot, and the installation of this spacer 16 could be carried out very precisely and reproducibly without any risk of disturbing the pixel areas in the case, for example, of a microdot screen.

FIG. 4 shows a spacer 17 of the pillar type whose drawing cross section is cruciform and whose bearing cross section, which corresponds this time to the drawing cross section, has a rectangular rectilinear surface of dimensions a, b. The spacer 17 furthermore has a height 1. One embodiment of such a spacer 17 was made with the following dimensions:

a=100 µm
b=2.1 mm
1=1 mm.

As in the case of the spacer 16, tests have shown that the spacer 17 is particularly well suited to use for display screens in which the precision with which the spacers are installed is high.

Figure 9:
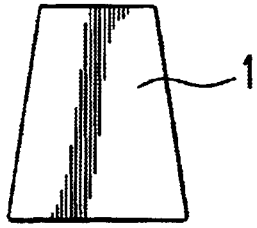
Figure 10:
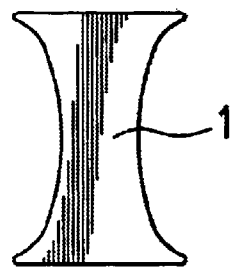

FIGS. 5 to 17 illustrate various drawing cross sections 1 that the spacers according to the invention may have. In particular, FIGS. 9 and 7 again show the drawing cross sections corresponding to the spacers in FIGS. 3 and 4, respectively.

The drawing cross sections 1 thus shown may, in some cases, constitute the bearing surface of the spacer or else, in other cases, they define the height of the spacer and therefore, for example, the distance which will separate two glass sheets.

FIGS. 8 to 17 illustrate various shapes of the drawing cross section 1, more particularly suitable for optical monitoring. Such monitoring is carried out, as mentioned above, in order to guarantee the dimensions of the spacer obtained by drawing. Such monitoring makes it possible, in particular, to measure the dimensions of the drawn rod and the centring of the latter with respect to the drawing device and more particularly with respect to the heating ring 4.

Figure 7:
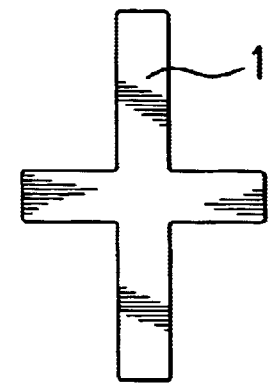
Figure 8:
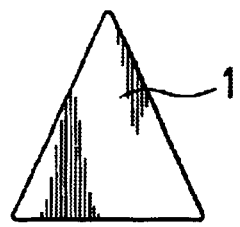
FIGS. 8 to 17: various possible shapes of the cross section of a spacer more particularly suitable for optical monitoring during the manufacture.
Figure 11:
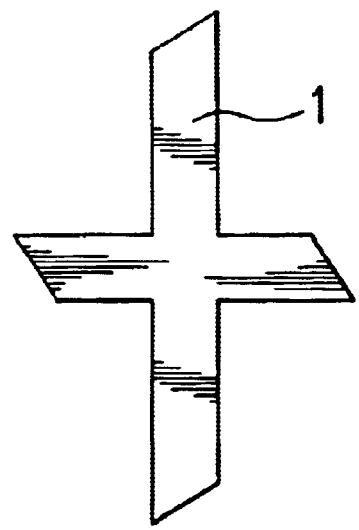
Figure 12:
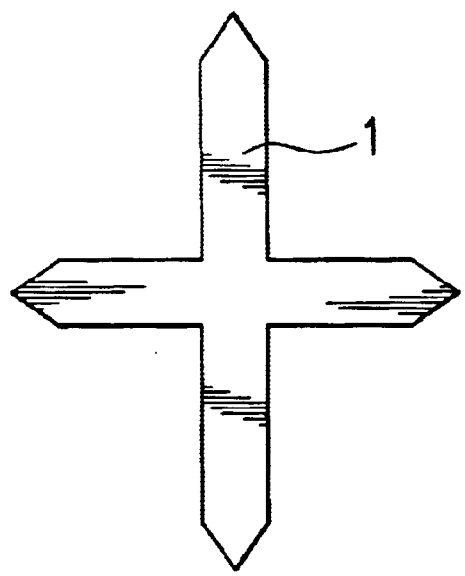
Figure 13:
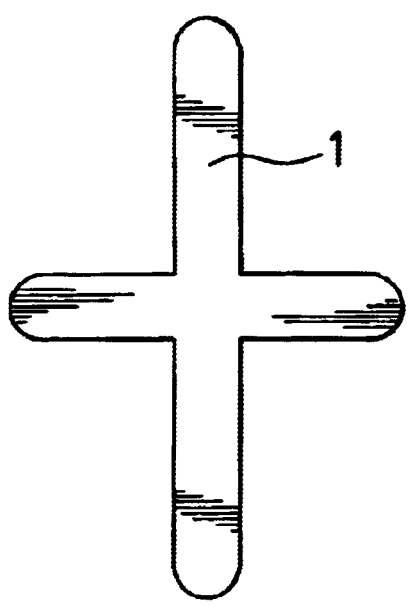
Figure 14:
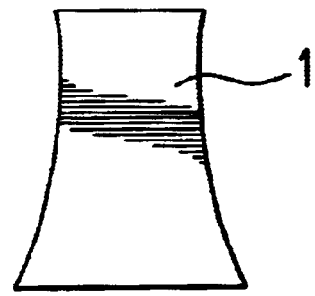
Figure 15:
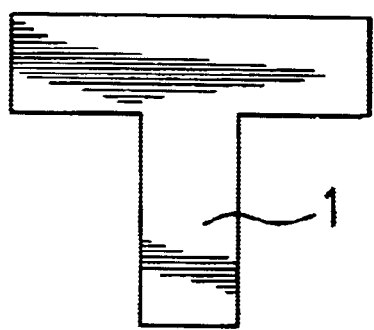
Figure 16:
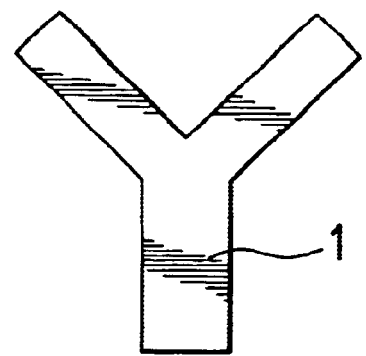
Figure 17:
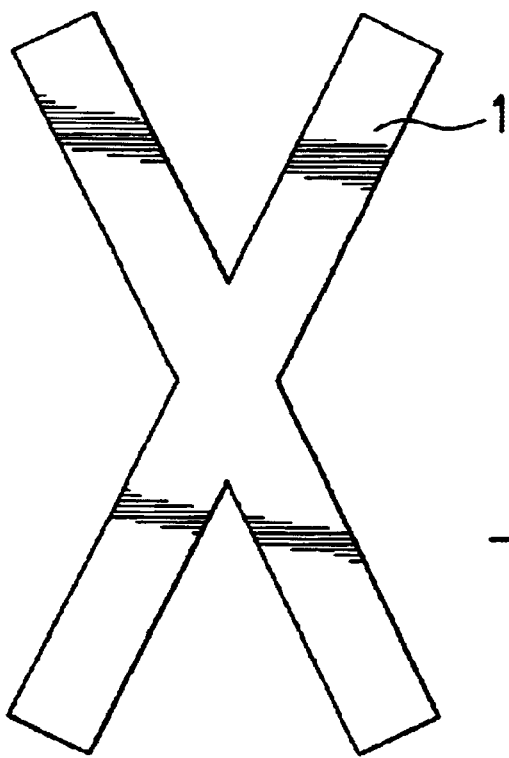

More specifically, FIGS. 11, 12 and 13 are embodiment variants of FIGS. 4 and 7.

These various FIGS. 8 to 17 show cross sections of the orthogonal polygon type which are "deformed" either by the presence of a rounded part or by a non-right angle.

It has been demonstrated that such shapes make it possible, during the optical monitoring, to combine examples of normal incidence with others which are not at normal incidence, thereby creating a contrast in the image obtained in transmission, comprising characteristic peaks. These peaks, associated with the abovementioned "deformations," facilitate the analysis and guarantee the possibility of obtaining the necessary measurements.

Of course, the invention must not be understood as limited to the embodiments presented in these various figures.

What is claimed is:

1. A glass spacer for keeping two flat substrates spaced apart,
   a body made of glass, the body having a height, 1, and an approximately polygonal bearing cross section configured to be beared onto a flat substrate and including at least one rectilinear bearing surface which fits within a rectangle having dimensions, a and b;
   wherein:
   a<300 µm, 0.2 mm<1<20 mm, b/a<1000, and 0.1<b/1; and
   the at least one rectilinear bearing surface is at least partly electronically conducting.

2. A glass spacer according to claim 1, wherein the body has an electrical resistance of between 0.1 GΩ and 200 GΩ.

3. A glass spacer according to claim 1, wherein the at least one rectilinear bearing surface contains conducting elements selected from the group consisting of Ag, Au and Cu.

4. A glass spacer according to claim 1, wherein the body is at least partially covered with a conductive coating.

5. A glass spacer for keeping two flat substrates spaced apart, comprising:
   a body made of glass, the body having a height, 1, and an approximately polygonal bearing cross section configured to be beared onto a flat substrate and including at least one rectilinear bearing surface which fits within a rectangle having dimensions, a and b;
   wherein:
   a<300 µm, 0.2 mm<1<20 mm, b/a<1000, and 0.1<b/1; and
   the body is at least partially delustered.

6. A glass spacer for keeping two flat substrates spaced apart, comprising:
   a body made of glass, the body having a height, 1, and an approximately polygonal bearing cross section configured to be beared onto a flat substrate and including at least one rectilinear bearing surface which fits within a rectangle having dimensions, a and b;
   wherein:
   a<300 µm, 0.2 mm<1<20 mm, b/a<1000, and 0.1<b/1; and
   the body is toughened by an ion-exchange treatment.

7. A glass spacer according to claim 1, wherein the approximately polygonal cross section has a plurality of edge portions rounded with a radius of curvature of between 2 and 10 microns.

8. A glass spacer according to claim 1, the approximately polygonal cross section is one of square, rectangular, triangular and trapezoidal.

9. A glass spacer according to claim 1, wherein the approximately polygonal cross section has one of a U shape, an H shape, a cross shape, and at least one crenellated part.

10. A glass product comprising:
    a plurality of glass sheets and having at least one surface layer; and
    a plurality of glass spacers disposed between the glass sheets and having a body made of glass, the body having a height, 1, and an approximately polygonal bearing cross section configured to be beared onto a flat substrate and including at least one rectilinear bearing surface which fits within a rectangle having dimensions, a and b,
    wherein:
    a<300 µm, 0.2 mm<1<20 mm, b/a<1000, and 0.1<b/1; and
    the at least one rectilinear bearing surface is at least partly electronically conducting.

11. A display screen comprising:
    a plurality of glass sheets; and
    a plurality of glass spacers disposed between the glass sheets and having a body made of glass, the body having a height, 1, and an approximately polygonal bearing cross section configured to be beared onto a flat substrate and including at least one rectilinear bearing surface which fits within a rectangle having dimensions, a and b, wherein a<300 µm, 0.2 mm<1<20 mm, b/a<1000, and 0.1<b/1; and
    the at least one rectilinear bearing surface is at least partly electronically conducting.

12. A glass spacer according to claim 1, wherein b/a<200.

13. A glass spacer according to claim 1, wherein b<3 mm.

14. A glass spacer according to claim 1, wherein the body has an electrical resistance of between 1 GΩ and 100 GΩ.

15. A glass spacer according to claim 1, wherein the body has an electrical resistance of 10 GΩ.

16. A glass spacer according to claim 1, wherein the approximately polygonal cross section has a plurality of edge portions rounded with a radius of curvature of between 5 and 10 microns.

17. A vacuum glazing comprising the glass product of claim 10.

18. A flat lamp comprising the glass product of claim 10.

19. A plasma screen comprising the display screen of claim 11.

20. A microdot screen comprising the display screen of claim 11.

21. A glass spacer according to claim 1, wherein $b/1 \leq 50$.

22. A glass spacer according to claim 1, wherein b<5 mm.

23. A glass spacer according to claim 1, wherein 5 mm<b.

24. A glass spacer according to claim 1, wherein the body has the shape of a prism whose cross section is an orthogonal polygon deformed on at least one of sides of the prism.

25. A glass spacer according to claim 24, wherein the cross section has at least one curved side.

26. A glass spacer according to claim 24, wherein the cross section has at least two consecutive sides forming a non-right angle.

* * * * *